United States Patent
Wendt et al.

(10) Patent No.: US 10,231,314 B2
(45) Date of Patent: Mar. 12, 2019

(54) POWER SPLITTER FOR A VARIABLE NUMBER OF LOADS AND POWER SPLITTING METHOD

(71) Applicant: PHILIPS LIGHTING HOLDING B.V., Eindhoven (NL)

(72) Inventors: Matthias Wendt, Würselen (DE); Bob Bernardus Anthonius Theunissen, Zaltbommel (NL); Henricus Theodorus Van Der Zanden, Sint-Oedenrode (NL); Lennart Yseboodt, Retie (BE)

(73) Assignee: PHILIP LIGHTING HOLDING B.V., Eindhoven (NL)

( * ) Notice: Subject to any disclaimer, the term of this patent is extended or adjusted under 35 U.S.C. 154(b) by 290 days.

(21) Appl. No.: 15/021,432

(22) PCT Filed: Aug. 28, 2014

(86) PCT No.: PCT/EP2014/068268
§ 371 (c)(1),
(2) Date: Mar. 11, 2016

(87) PCT Pub. No.: WO2015/039848
PCT Pub. Date: Mar. 26, 2015

(65) Prior Publication Data
US 2016/0227630 A1    Aug. 4, 2016

(30) Foreign Application Priority Data
Sep. 20, 2013  (EP) ..................... 13185341

(51) Int. Cl.
*H04L 12/10* (2006.01)
*H05B 37/02* (2006.01)
*G06F 1/26* (2006.01)

(52) U.S. Cl.
CPC ......... *H05B 37/0254* (2013.01); *G06F 1/266* (2013.01); *H04L 12/10* (2013.01); *H05B 37/029* (2013.01)

(58) Field of Classification Search
CPC ...... H04L 12/10; G06F 1/266; H05B 37/0254
See application file for complete search history.

(56) References Cited

U.S. PATENT DOCUMENTS

| | | | |
|---|---|---|---|
| 7,203,849 B2 * | 4/2007 | Dove | G06F 1/266 361/731 |
| 2006/0165096 A1 | 7/2006 | Heath et al. | |

(Continued)

FOREIGN PATENT DOCUMENTS

| | | |
|---|---|---|
| CN | 102238013 A | 11/2011 |
| CN | 102664741 A | 9/2012 |

(Continued)

OTHER PUBLICATIONS

3COM, "3COM Power Over Ethernet Multiport Midspan Solution," 3COM Power Over Ethernet Multiport Midspan Solution Data Sheet, 2003 (4 Pages).

(Continued)

*Primary Examiner* — Ryan Johnson
(74) *Attorney, Agent, or Firm* — Meenakshy Chakravorty

(57) ABSTRACT

The invention relates to a power splitter for a variable number of loads, a power splitting method for a variable number of loads and a software product for power splitting. It is possible to provide power splitting for a variable number of loads, which allows for an efficient distribution of power while reducing unnecessary overhead, with the determination of an overall power demand for the variable number of loads being concentrated in the power splitter, which may then request the desired amount of power from the power supply.

15 Claims, 3 Drawing Sheets

(56) References Cited

U.S. PATENT DOCUMENTS

| | | | |
|---|---|---|---|
| 2006/0226712 A1 | 10/2006 | Eldredge | |
| 2007/0085675 A1* | 4/2007 | Darshan | H04L 12/10 340/538.11 |
| 2007/0284946 A1 | 12/2007 | Robbins | |
| 2008/0168283 A1* | 7/2008 | Penning | G06F 1/263 713/310 |
| 2008/0294917 A1 | 11/2008 | Khan et al. | |

FOREIGN PATENT DOCUMENTS

| | | |
|---|---|---|
| CN | 102916387 A | 2/2013 |
| WO | 2012028981 A1 | 3/2012 |
| WO | 2013062567 A1 | 5/2013 |

OTHER PUBLICATIONS

IEEE, "802.3AF, IEEE Standard for Information Technology—Telecommunications and Information Exchange Between Systems—Local and Metropolitan Area Networks—Specific Requirements," IEEE STD 802.3AF 2003 (133 Pages).

Mendelson, Galit, All You Need to Know About Power Over Ethernet (POE) and the IEEE 802.3AF Standard, Jun. 2004 (24 Pages).

\* cited by examiner

POWER SPLITTER FOR A VARIABLE NUMBER OF LOADS AND POWER SPLITTING METHOD

CROSS-REFERENCE TO PRIOR APPLICATIONS

This application is the U.S. National Phase application under 35 U.S.C. § 371 of International Application No. PCT/EP2014/068268, filed on Aug. 28, 2014, which claims the benefit of European Patent Application No. 13185341.8, filed on Sep. 20, 2013. These applications are hereby incorporated by reference herein.

FIELD OF THE INVENTION

The invention relates to a power splitter for a variable number of loads, a power splitting method for a variable number of loads and a software product for power splitting.

BACKGROUND OF THE INVENTION

WO 2012/028981 A1 discloses management in a Power-over-Ethernet (PoE) installation, wherein a management unit comprises a plurality of ports to which different external device can be connected and is adapted for controlling the power delivered to the respective ports.

CN 102 664 741 A discloses a cascading arrangement in the context of Power-over-Ethernet, wherein a powered device (PD) connected to a power sourcing equipment (PSE) in turn functions as a PSE for further PDs.

WO 2013/062567 A1 relates to determining whether power is supplied at a power level to a network powered device. A network connector can be used to provide power and communications to the network powered device. The network powered device can represent itself to power sourcing equipment as a device using power at the power level. An indicator indicates whether power is supplied at the power level.

US 2006/0226712 A1 discloses a power converter capable of providing a range of DC voltages to external devices and a method of providing of a range of DC power. The power converter comprises a supply circuit for receiving a request for DC power and for providing the requested DC power. In one embodiment, a splitter may be connected to and communicate with a source in correspondence to such external device, wherein the splitter then uses the power from the source to supply multiple devices.

SUMMARY OF THE INVENTION

It is an object of the present invention to provide power splitting for a variable number of loads, which allows for an efficient distribution of power while reducing unnecessary overhead.

In a first aspect of the present invention a power splitter for a variable number of loads is presented, which comprises a plurality of ports, to each of which a load is connectable, a power unit arranged for receiving power from an external power supply and for supplying power to the plurality of ports, a control unit arranged for detecting, during operation, which of the ports is populated by a load, and for determining a total amount of power required for powering the loads populating the ports, wherein the control unit is further arranged for communicating to the power supply a power request based on the determined total amount of required power.

In a second aspect of the present invention a power splitting method is presented for a variable number of loads by means of a power splitter comprising a plurality of ports, to each of which a load is connectable, which comprising the steps of detecting which of the ports is populated by a load, determining a total amount of power required for powering the loads populating the ports, communicating a power request to a power supply based on the determined total amount of required power, and splitting power received from the power supply to the ports for supplying at least a part of the loads populating the ports.

In a third aspect of the present invention a software product for power splitting is presented, the software product comprising program code means for causing a power splitter to carry out the steps of a method according to the present invention when the software product is run on the power splitter according to the present invention.

It is disclosed also a power splitting system according to the present invention, which comprises a power splitter according to the invention and a plurality of lamps, each of the lamps being connected to a respective port of the power splitter as a load.

The invention was made based on the following insights:

Power-over-Ethernet (PoE) was originally conceived as an approach to supply detached data equipment and peripherals through the same wire that is already used to connect these to the Ethernet. Currently discussion are coming up to employ the same approach for all kinds of (low) power consumers like lighting equipment (sensors, switches, light sources) or entertainment appliances like active speakers, internet radios, DVD players, set-top boxes and even TV sets. Here actual standardization is going to support power levels even above 50 W per Cat5/6 connection. Particular standards for Power-over-Ethernet are IEEE 802.3af-2003 (the terms "Power-over-Ethernet" and "PoE" are often understood as referring to this particular standard) and IEEE 802.at-2009 (also referred to by "PoE+" or "PoE plus").

One upcoming field for applying PoE is in lighting systems. A new generation of LED based lamps make use of a central power supply as provided by PoE in a network infrastructure. In addition, the use of inexpensive network cables allows for reductions in installation costs and the inherent safety and polarity control works towards reducing installation errors. In the context of lighting system, most load devices for PoE installations are light sources, wherein also other devices like sensors or user interface devices may be powered by PoE as well.

When the PoE standard IEEE 802.3af-2003 was introduced supplying detached networking devices like routers, switches printer spoolers etc., it was an exchange for small power-plug type power supplies. As the originally intended loads where mostly already equipped with communication and processing means the overhead for the PoE and PoE+ support with analog negotiations as well as Ethernet negotiation was relatively low.

FIG. 1 shows a schematic overview of a known PoE system. The PoE system shown consists of the power sourcing equipment (PSE) 1 including a power supply 11 and one conventional PoE load 400 (PoE loads are usually called "Powered Device" or "PD") including a power consuming unit 403 and a processing unit 404. The connection 14 between the PSE 1 and the PD 400 is done by means of a so called patch cable between one of the output jacks 12 of the PSE 1 and the input jack 401 of the PD 400. In PoE systems typically power supply and data connectivity are sharing the same patch cable 14. In multi load systems each load gets connected to a separate output port of a plurality of ports 12, 13 of the PSE 1. Each load PD 400 negotiates separately the availability of its required power with the PSE 1. This requires a powered device controller 402 on the PD side in each load 400. On the PSE side a PSE management controller 18 supervises the negotiations on all ports.

It was realized that in particular in the new application field of lighting systems (often with small loads having no or only low local computing and communication requirements) the overhead of communication and processing compared to the load complexity may easily become inappropriate.

This is especially true for small light points as used e.g. for starry sky type of lighting installations. In these each particular load as such is often just one LED device. In contrast, however, in such installations which do not use PoE the same driver may be shared by many light points. It is desirable to find a more cost effective solutions which nevertheless provides benefits comparable to the PoE approach (e.g. variable number of loads).

The inventors realized that, in order to reduce the overhead of IP controls and PoE power processing per light point a lamp driver may be introduced that takes power from, for example, a power over Ethernet port and splits this towards multiple light sources. The light sources do not need any local communication and processing means. The light sources may however have means informing the PoE negotiator for the required power level. The driver may include processing and communication means in order to be controlled over internet protocol (IP) and to negotiate with a PSE with regard to the required power level.

It is possible to provide power splitting for a variable number of loads, which allows for an efficient distribution of power while reducing unnecessary overhead, with the determination of an overall power demand for the variable number of loads being concentrated in the power splitter, which may then request the desired amount of power from the power supply.

In a preferred embodiment the control unit of the power splitter is further arranged for determining, during operation, a respective power demand of each load populating a port, wherein the total amount of power required is calculated from the sum of the respective power demands.

Determining the respective power demand for each load allows for a broad versatility of the power splitter, which may therefore advantageously be used in a variety of different implementations.

In a preferred embodiment the power unit is arranged for supplying a respective predetermined power amount to each of the plurality of ports, wherein the control unit is arranged for determining the total amount of power required by adding up the respective predetermined power amounts for the populated ports.

As an alternative to the above embodiment, each port may be provided, if populated, with a predetermined power amount. Accordingly, the control and the determination of the overall power amount is simplified. It is to be noted that the respective predetermined power amount of one of the ports does not necessarily have to be identical to that of one or more of the other ports. Indeed, there might be a different predetermined power amount provided for each of the ports, while also all ports may have the same predetermined power amount foreseen.

It is to be noted that in a further preferred embodiment (or modification of the above embodiments) the aspect of predetermined power amounts may be used for a first set of one or more ports to be populated, while for a second set of one or more ports to be populated, the aspect of determining, during operation, a respective power demand may be used. A further option might include a predetermined power amount for a port, which may be overwritten by information obtained from the load populating the port.

In a modification of the above embodiment the control unit further includes one or more sensing elements for sensing a characteristic of a load populating a port, the characteristic being indicative of the power demand of the load.

Even in the case that the power amount supplied to a populated port is not fixed, the load does not have to communicate its demand and indeed the load may be completely passive in this respect. Options for sensing the characteristic include the provision of an element having a detectable electric property (preferably a resistor, wherein also other elements may be used) which is provided in the load and connectable to the power splitter, either by spare (or dedicated) contacts or by means of the wiring for providing the power itself (for example by means of a voltage divider, either with or without a pull-up resistor involved).

In a further modification of the above embodiment the control unit is arranged for receiving a demand signal from a load populating a port, the demand signal being indicative of the power demand of the load.

As an alternative to the above modification, the load might also be able to communicate a demand to the port (or the power splitter in general). In this context, the means of communication may correspond to a PoE-approach (either using the negotiation provided for by PoE or even the Ethernet connection, if available). Also other means of communication may be used, for example wireless communication.

In a preferred embodiment at least one of the ports is provided with a driving unit for driving an operation of a load populating the port.

The power splitter of the present invention may not only include the elements for collecting (or adding) the power demands for multiple loads and for negotiating the total amount of power with a power supply, the power splitter may also include driving units for the loads. Accordingly, in such case the load to be connected may be reduced to basically just a LED with some wiring, wherein the circuitry for driving the LED would be included in the power splitter.

In a preferred embodiment the control unit is arranged, in case the total amount of power required is larger than an amount of power to be received from the external power supply, for indicating such overload to the outside and to prevent the power unit from supplying power to all or selected loads populating the ports.

In case of an overload (which may also be considered as an undersupply), there is a danger that by still distributing the available power proportionally to the connected loads, a load may experience a critical undersupply. Thus, the power splitter according to this embodiment may refrain from providing any power while indicating the overload by appropriate means (e.g. a blinking LED, in particular at the populated ports), such that a user may take measures to remove the overload. Another approach would be to prevent a power supply to selected loads, which might be selected based on the respective port (i.e. there might be ports which have "guaranteed supply" while other receive power only if additional power is available without overload), the power demand of the load (e.g. cutting power to the load(s) having the greatest demand(s) or to that/those having the smallest demand(s)).

In a preferred embodiment the control unit is arranged for detecting, during operation, a current amount of power supplied by the power unit to the plurality of ports and for communicating a reduced power request according to the current amount of power supplied in case of an underload where the current amount of power supplied undercuts the previously determined total amount of required power by a predetermined amount and/or for a predetermined period of time.

If it is determined that a previously provided power request does not correspond (any longer) to the current situation, communication of such information to the external power supply allows for an improved management also on the side of the external power supply.

Checking for connection of an additional load populating a port, a disconnection of a previously populated port, a replacement of a load by another load together with the determination of the power demand may be done continuously, intermittently and/or based on a user input or some other request. Correspondingly, renegotiation of the power request may also be provided continuously, intermittently and/or based on a user input or some other request.

The power splitter may also be provided with a power consumption measuring unit which measures the actual power consumed by the loads (i.e. the actual amount of power split, either in total or port by port), wherein it may be determined that the actual amount is less that determined as required. A reason for such situation may be that a lamp is rated for a particular power demand (indicated to the power splitter), while the actual consumption is less.

In a modification of the above embodiment, the power splitter further comprises a memory for storing information indicative of a current amount of power detected by the control unit, wherein the control unit, upon detecting the case of the underload, is arranged for restart of the power splitter and for reading the information from the memory after the restart.

The power splitter may, for example, have local flash memory storing the load that has been negotiated in a last sequence, wherein the stored information may be used in order to speed up detection of attached loads and negotiation process upon the next power up.

In a preferred embodiment the control unit is further arranged for receiving a control instruction regarding at least one load populating one of the ports and for controlling the power unit in accordance with the control instruction.

The power splitter may have the additional functionality of a controlling device for switching on and off of loads or other ways of control. The control instruction may be provided by a sensor or switch connected to the power splitter itself (the connection may employ also PoE), by a sensor or switch included in the load, or by other means, e.g. in wireless manner.

In a preferred embodiment the power unit is arranged for receiving power from the external power supply according to a Power-over-Ethernet standard.

It shall be understood that the power splitter of claim 1, the power splitting system of claim 12, the power splitting method of claim 13, and the computer program of claim 14 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings.

DETAILED DESCRIPTION OF EMBODIMENTS

Figure 1:
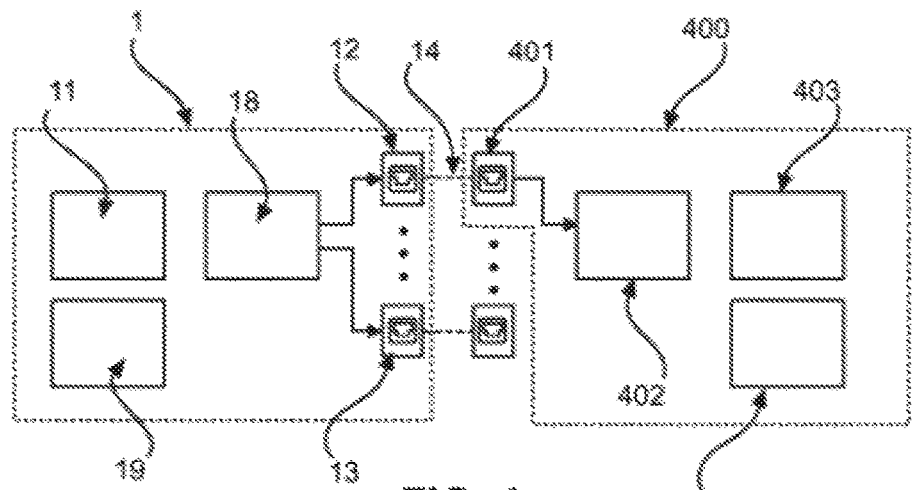
FIG. 1 shows a schematic overview of a known PoE system.

FIG. 1 shows a schematic overview of a known PoE system and is discussed above.

Figure 2:
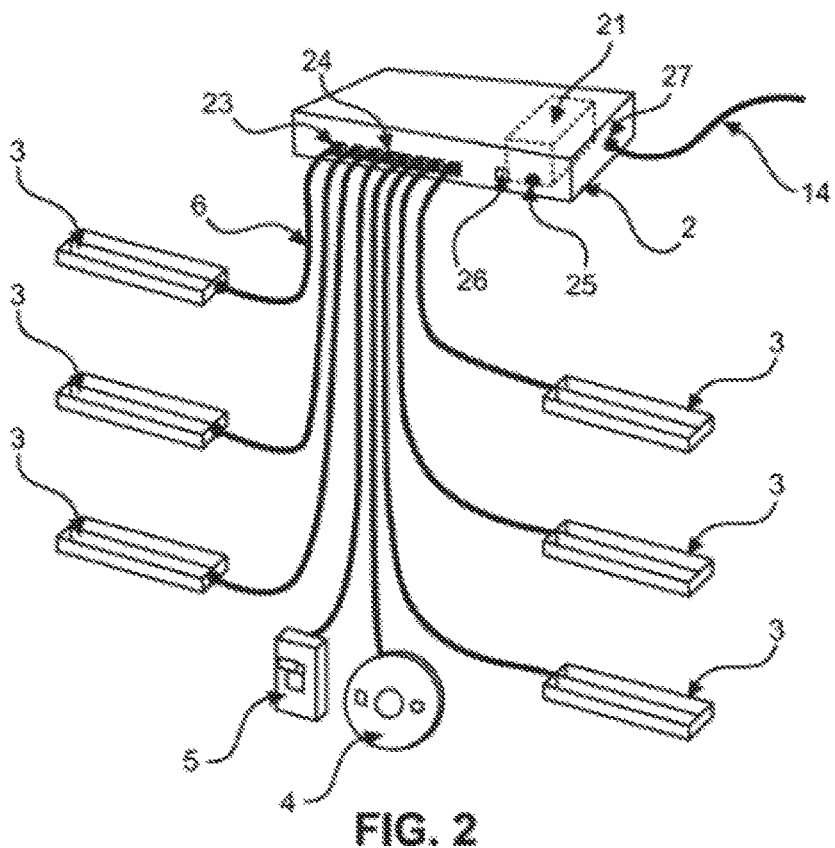
FIG. 2 shows a schematic overview of a power splitting system in accordance with an embodiment of the invention.

FIG. 2 shows a schematic overview of a power splitting system in accordance with an embodiment of the invention.

The power splitting system shown in FIG. 2 includes a power splitter 2, to which several loads 3 in form of lamps are connected by cables 6. Additionally, to the power splitter a sensor 4 and a manual switch 5 are coupled. The power splitter is connected via cable 14 to a power supply (not shown).

The power splitter 2 is arranged for receiving power by means of PoE, wherein the cable 14 acts as a Ethernet/PoE connection. In terms of PoE, in this respect the power splitter 2 is a powered device (PD) to the power source equipment in form of the power supply.

The power splitter 2 includes central electronics 21 (including the control unit) and is provided with a plurality of ports 23 (here: six ports 23) and a plurality of sockets 24 (here: two sockets 24). The power splitter further includes a connector 27 for the cable 14, a light indicator 25 and a button 26.

To the ports 23, there are connected loads 3 in form of light sources. To the sockets 24, the sensor 4 and the switch 5 are coupled. The sensor 4 and the switch 5, if not totally passive, may also be considered as loads having a certain power demand.

The power received via the cable 14 gets routed towards the light sources 3 and if necessary to the sensor 4 and the switch 5.

The cables 6 used here may be the same Cat5/6 patch wires as used for conventional PoE connections. However, unless PoE is also to be used for powering the loads 3, using a different type of wiring is beneficial in that connections cannot be accidentally be confused. If the same cable and connector type were used, such loads should be designed such not to get destroyed when accidentally be connected to the power splitter 2.

The central electronics 21 negotiates the appropriate power level for the connected loads 3 with the power supply.

In the present embodiment, the power splitter 2 is provided for supplying a constant voltage of 24 V to each port 23, wherein the current is limited such that the power per port 23 does not exceed 5 W. The central electronics 21 includes detecting means for determining whether or not a port 23 is populated by a load 3. In this case, the detection is based on an additional contact in the port 23 which is connected only when the port is populated. Alternative approaches are also possible, e.g. by means of a mechanical contact sensor sensing the presence of a connector in the port. The required power is calculated from the number of populated ports 23, wherein the central electronics 21 is arranged for requesting a corresponding amount of power from the power supply (not shown) via the cable 14.

The light indicator 25 is used for indicating a status of the power splitter 2, wherein the button 26 allows for switching on an off of the overall power splitting system.

The power splitter 2 is further arranged to receive input from the switch 5 and the sensor 4. An implementation may use the sensor 4 for detection of ambient light, thus allowing for an automatic control of the light sources 3 depending on the overall light situation. The switch 5 may be used for switching on an off the light sources 3, overriding the sensor 4.

Figure 3:
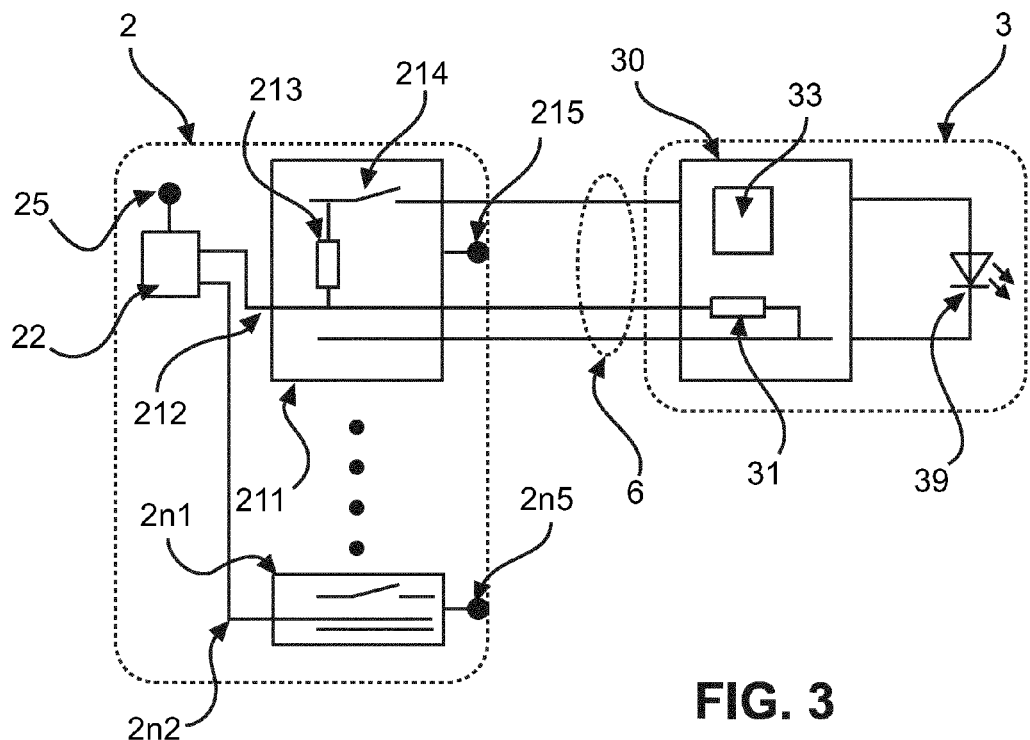
FIG. 3 shows a schematic illustration of a power splitting system in accordance with another embodiment of the invention.

FIG. 3 shows a schematic illustration of a power splitting system in accordance with another embodiment of the invention.

For the sake of simplification and explanation, details of the power splitting system as illustrated in FIG. 2 (e.g. cable 14, ports 23, sockets 24, sensor 4, switch 5, button 26) are not shown, even though these elements may nevertheless be employed also in the following embodiments.

As an alternative or as an addition to the above embodiment, it is also possible to provide an information means per load that signals the requested power level. In a very simple form this may be a resistor connected to a spare contact which informs about the power required, for example, in a case of using a sensing voltage, by causing a current indicative of the required power, or in a case of using a sensing current, by causing voltage drop indicative of the required power. In a more developed embodiment two resistors form a voltage divider so that with a fixed voltage applied for the load (e.g. load is using a fixed 5 V constant voltage) also the voltage divider takes that voltage and divides to a sensing voltage to be read at the port.

The power splitting system of FIG. 3 is shown with a lamp 3 as a load. Even though only one lamp 3 is shown, there might be a variable number of such lamps (also with different characteristics) provided.

The lamp 3 is connected via a low voltage DC cable 6 to the power splitter 2 and includes a light source 39 (LED) and lamp circuitry 30 including a current driver 33 and a single resistor 31.

The power splitter 2 includes (in addition to other elements, see above) a control unit 22, to which a light indicator 25 is connected for easy visual communication to a user, and detecting circuits 211-2n1, which are connected to the control unit 22 by internal wiring 212-2n2. For each of the plural ports to be populated of the power splitter 2, there is provided a respective wiring 212-2n2 and detecting circuit 211-2n1. A detecting circuit 211-2n1 includes a pull-up resistor 213-2n3, an isolation switch 214-2n4 and an indicator 215-2n5.

The control unit 22 is adapted to read per port a sensing voltage which is the pull-up voltage (for example a load voltage 5V) whenever the respective port is not populated by a compatible load device 3. With the load 3 being connected, the two resistors 213 and 31 form a divider where the resulting sensing voltage Vsens is a representation for the required load power at that port.

This can be in a linear manner following a linear equation (Preq=(Vmax−Vsens)/Vmax*Pmax), with Preq as required power, Vmax as maximum voltage, Vsens as sensing voltage and Pmax as maximum power. Alternatively, the relation may be according to a table like the following:

| Vsens | Preq |
| --- | --- |
| 0 V ... 1 V | 0 W |
| 1.1 V ... 1.5 V | 1 W |
| 1.6 V ... 2 V | 2 W |
| 2.1 V ... 2.5 V | 3 W |
| 2.6 V ... 3 V | 5 W |
| 3.1 V ... 3.5 V | 10 W |
| >3.5 V | 0 W |

The control unit reads the voltages from the different detecting circuits and sums up the requested power over all connected channels (populated ports). The sum gets requested from the power supply (not shown) if it is within the limits allowed for the connection (e.g. PoE+ max 25.5 W for one Cat5/6).

In case a power is requested higher in sum than available (e.g. more than suppliable by the power supply or more than granted to be supplied by the power supply), a signal is generated signaling overload by means of the light indicator 25.

In view of the details of a particular implementation, a large variety of rules is possible which can be used for addressing the overload, e.g. that only so many ports are switched on that the maximum allowed power (or accepted power in negotiation) gets distributed to the loads (so some may be kept off). Another possible approach is to completely stop the power splitting (i.e. the power to the ports) until the overload is resolved.

Switching the ports individually on is realized by the isolation switches 214-2n4 per port. Indicators 215-2n5 at each port inform about which ports are off due to overload condition.

Figure 4:
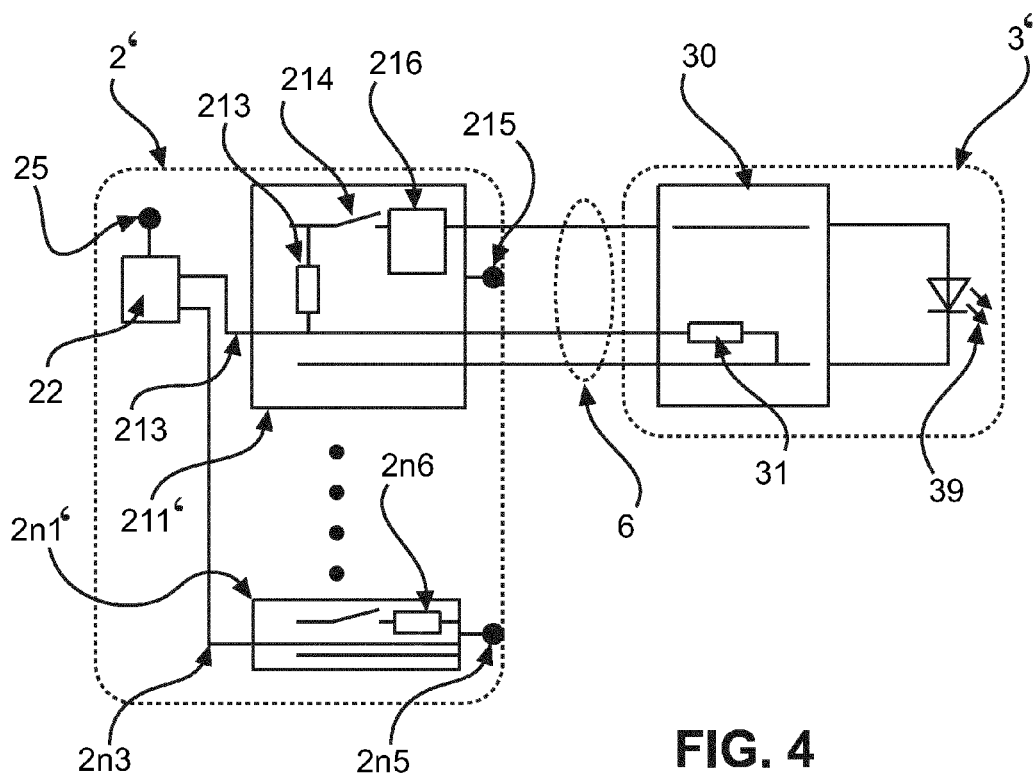
FIG. 4 shows a schematic illustration of a power splitting system in accordance with a further embodiment of the invention.

FIG. 4 shows a schematic illustration of a power splitting system in accordance with a further embodiment of the invention.

The overall arrangement of the power splitting system shown in FIG. 4 corresponds to that of the power splitting system shown in FIG. 3 except that the current drivers 216-2n6 are not provided in the load 3' but in the power splitter 2', more particularly as parts of the detecting circuits 211'-2n1'. Therefore, the load 3' includes just the light source 39 (LED) and the resistor 31 indicating the characteristics of the light source 39.

This means that the loads 3' do not get connected to a constant voltage but get driven with the required current. This is realized by one current driver per channel (216-2n6). In this case, the current programming is done with the resistor 31 per load 3'.

To keep power and current per load separate two programming resistors may be used. However, in order to reduce the number of required components the current programming may directly give information about the power level required (e.g. 100 mA for 1 W, 500 mA for 5 W, 1.000 A for 10 W). The relation may be linear as shown in this example but also may be artificial and controlled through a table.

Figure 5:
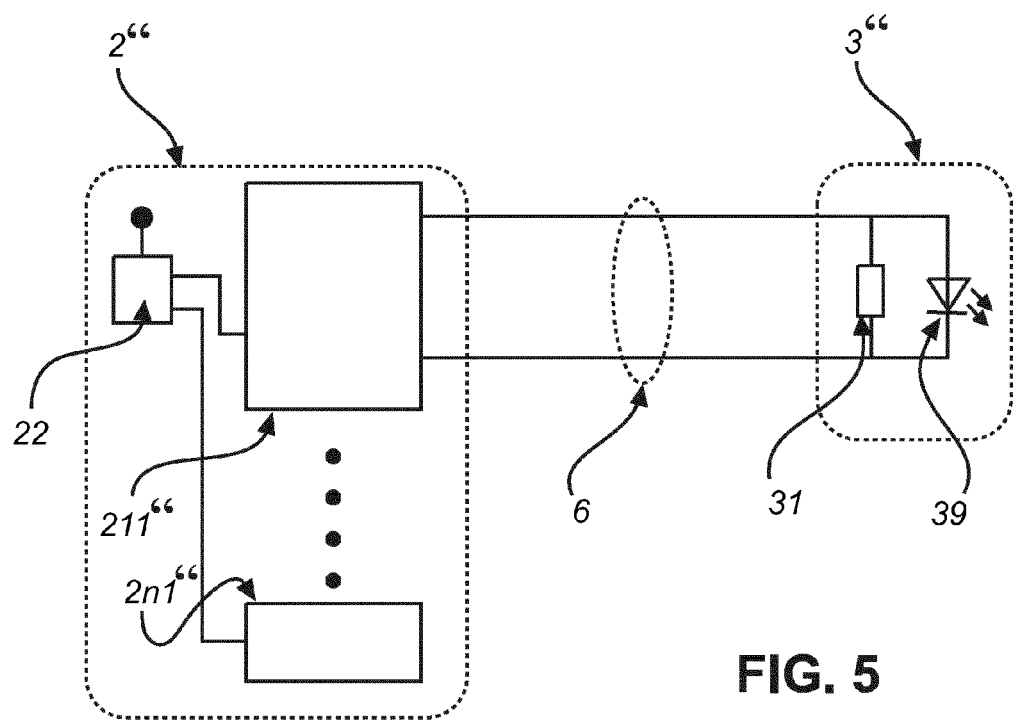
FIG. 5 shows a schematic illustration of a power splitting system in accordance with yet another embodiment of the invention.

FIG. 5 shows a schematic illustration of a power splitting system in accordance with yet another embodiment of the invention.

In comparison to the embodiments of FIGS. 3 and 4, for example, the embodiment shown in FIG. 5 is further simplified as to the construction of the load 3". In the loads 3" of this embodiment, a resistor 31 is provided in parallel to the light source 39 (in the form of an LED). The detecting and driving circuits 211"-2n1" for the ports of the power splitter 2" can read the resistance of the resistor 31 by presenting a sensing voltage to the lamp that is below burning voltage of the light source 39 (e.g. 2.5V). As the LED will not carry current, the only current carried is in the resistor 31 connected. As previously indicated, the value of the resistor 31 is indicative of the power demand of the load 3.

An alternative way for reading out the resistor 31 is in the driver 211"-2n1" presenting in PWM pauses or before starting the light source 39 a negative testing voltage which will also allow measuring the resistor 31 separately.

Typically the resistance of the resistor 31 for this embodiment will be chosen so big that during normal operation the current through that resistor can be neglected against the load current through the light source 39 (thus keeping any losses due to the sensing function low or even negligible).

Figure 6:
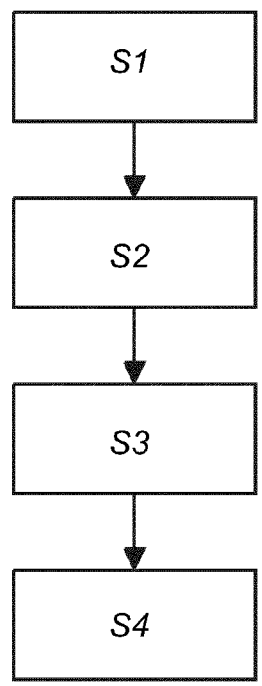
FIG. 6 shows a flow diagram illustration a power splitting method in accordance with an embodiment of the invention.

FIG. 6 shows a flow diagram illustration a power splitting method in accordance with an embodiment of the invention.

In a first step S1, for a plurality of ports of a power splitter, to each port of which a load is connectable, it is detected which of the ports is currently populated by a load.

Based on the detection result, in a following step S3, a total amount of power required for powering the loads populating the ports is determined.

Based on the determined total amount of required power, in a further step S5, a power request is communicated to a power supply. Provided there is a positive response from the power supply (i.e. at least a portion of the requested power may be provided), in step S7, power received from the power supply is split to the ports for supplying at least a part of the loads populating the ports.

While the invention has been illustrated and described in detail in the drawings and foregoing description, such illustration and description are to be considered illustrative or exemplary and not restrictive; the invention is not limited to the disclosed embodiments.

In addition to the power request, the control unit of the power splitter according to the present invention may also signal the number of populated ports (or the number and some identification of populated port which may be controlled individually), thus giving an indication of separately controllable "channels".

In another embodiment, a load may include a sensor, wherein possible sensor types in particular in the context of using the power splitter of the invention with lamps or light sources as loads include presence and daylight sensing devices. The sensor may either be used only for use internal to the load (e.g. controls the load directly) or may provide information to the power splitter for additional control of perhaps also other loads.

In the embodiments illustrated above, the connection between the load and the power splitter is provided by simple DC wiring. The present invention is not limited to a connection like this and also for the connection between the power splitter and the respective load PoE may be used, even though preferably without the communication option over the Ethernet. The power provided may be settled to a level as determined by the type of load (e.g. depending on an LED assembly in the luminaire) according to the PoE standard.

The present invention allows not only for a power to be supplied to the respective loads which is constant over time, but it may also be provided that there is some change in time, e.g. a fluctuation of the provided/demanded power of a load.

The power splitter may also be arranged for using variations on the voltage provided such that controlling a dim/flux level may be implemented between the power splitter and the (plurality of) load(s).

It is to be understood that the present invention may also be implemented by a power splitter having PoE input for power and data, one or more simplified DC/PoE only outputs and zero or more PoE outputs including Ethernet. Accordingly, sensors and switches may also be connected to the power splitter for improved control over the power splitting system including the loads. Additionally or alternatively, the power splitter may be arranged for communicating in a wireless manner and for receiving data send by switches, sensors and the like.

In addition to the embodiments discussed above, another option is that the power splitter calculates a sum of load power as required for the loads populating the ports of the power splitter. If there is a reduction in required power the power splitter informs the power supply about a reduced power budget, in particular if the total power is substantially smaller that the currently negotiated power. Two possible approaches are as follows:

If, for example, the power supply and the power splitter are connected by means of PoE, the power splitter may drop the PoE connection for a short time and may thus cause the start of a new negotiation between the power splitter and the power supply. The previously determined (reduced) power demand is stored and made available for communication to the power supply after restart.

If, for example, the power supply and the power splitter are coupled by some other communication means, e.g. Ethernet in addition to just the power aspect of PoE, the communication may directly include an indication to the power supply as to the reduced amount of power required.

In a further embodiment, the present invention provides a negotiating DC power distributing system wherein in contrast to known PoE arrangements power request and negotiation functionality is concentrated for multiple simplified loads. Preferably, the load request gets summed over all ports with loads connected and used in power negotiation. Particularly, the loads signal their power request in a passive way, e.g. by means of a resistance presented on the connector. Advantageously, the output value to the simplified loads may be a constant voltage, a constant current and/or constant/maximum power. For the case of an overload, deactivation of loads that cannot be supplied may be foreseen. Additionally, the system may have an overload indicator in the driver and/or overload indicators at each port signaling deactivated ports. The system may provide that it is decided after a PoE power negotiation how much power is available for splitting to the loads.

In the present application, the terms "Power-over-Ethernet" and "PoE" are primarily referring to IEEE 802.3af-2003 or IEEE 802.3at-2009, while "PoE+" refers specifically to IEEE 802.3at-2009. Nevertheless, the skilled person will appreciate (unless indicated otherwise in particular instances) that the concept of "Power-over-Ethernet" as discussed herein is not limited to the exact details of IEEE 802.3af-2003 or IEEE 802.3at-2009. Furthermore, the invention applies also to future developments of IEEE 802.3af-2003 or IEEE 802.3at-2009.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like detecting the population of a port, determining the total power for the populated ports, communicating power requests and splitting of power can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A power splitter for a variable number of loads, comprising:
   a plurality of ports, to each of which a load is connectable,
   a power unit arranged for receiving power from an external power supply and for supplying power to the plurality of ports,
   a control unit arranged for detecting, during operation, which of the ports is populated by a load, and for determining a total amount of power required for powering the loads populating the ports,
   wherein the control unit is further arranged for communicating to the power supply a power request based on the determined total amount of required power, wherein the control unit is further arranged for detecting a signal representative of a resistance of a first sense resistor, the resistance of the first sense resistor being indicative of the power demand of the load, wherein the load is a lamp comprising at least one LED, the first sense resistor being disposed in the lamp and in parallel with the LED,
   wherein the power unit is further configured to apply a sense voltage to the first sense resistor, and wherein the sense voltage is below a voltage required to illuminate the LED or is a negative voltage with respect to the LED.

2. The power splitter according to claim 1, wherein the control unit is further arranged for determining, during operation, a respective power demand of each load populating a port, wherein the total amount of power required is calculated from the sum of the respective power demands.

3. The power splitter according to claim 2, wherein the control unit is arranged for receiving a demand signal from a load populating a port, the demand signal being indicative of the power demand of the load.

4. The power splitter according to claim 1, wherein the power unit is arranged for supplying a respective predetermined power amount to each of the plurality of ports, wherein the control unit is arranged for determining the total amount of power required by adding up the respective predetermined power amounts for the populated ports.

5. The power splitter according to claim 1, wherein at least one of the ports is provided with a driving unit for driving an operation of a load, populating the port.

6. The power splitter according to claim 1, wherein, in case the total amount of power required is larger than an amount of power to be received from the external power supply, the control unit is arranged for indicating such overload to the outside and to prevent the power unit from supplying power to all or selected loads populating the ports.

7. The power splitter according to claim 1, wherein the control unit is arranged for detecting, during operation, a current amount of power supplied by the power unit to the plurality of ports and for communicating a reduced power request to the external power supply according to the current amount of power supplied in case of an underload where the current amount of power supplied undercuts the previously determined total amount of required power by a predetermined amount and/or for a predetermined period of time.

8. The power splitter according to claim 7, further comprising a memory for storing information indicative of a current amount of power detected by the control unit, wherein the control unit, upon detecting the case of the underload, is arranged for restart of the power splitter and for reading the information from the memory after the restart.

9. The power splitter according to claim 1, wherein the control unit is further arranged for receiving a control instruction regarding at least one load populating one of the ports and for controlling the power unit in accordance with the control instruction.

10. The power splitter according to claim 1, wherein the power unit is arranged for receiving power from the external power supply according to a Power-over-Ethernet standard.

11. A power splitting system, comprising:
   the power splitter according to claim 1,
   a plurality of lamps each of the lamps being connected to a respective port of the power splitter as a load.

12. The power splitter according to claim 1, further comprising a second sense resistor disposed in parallel with the load and in series with the first sense resistor, the first sense resistor and the second sense resistor forming a voltage divider, wherein the signal representative of a resistance of the first sense resistor is a voltage at the connection of the first sense resistor and the second sense resistor.

13. The power splitter according to claim 12, wherein power is supplied to the load through a first contact, wherein the first sense resistor is connected to the second sense resistor through a second contact.

14. A power splitting method for a variable number of loads by means of a power splitter comprising a plurality of ports, to each of which a load is connectable, comprising the steps of:
   detecting which of the ports is populated by a load;
   detecting a signal representative of a resistance of a first sense resistor disposed in parallel with the load, the resistance of the first sense resistor being indicative of the power demand of the load, wherein the load is a lamp comprising at least one LED, the first sense resistor being disposed in the lamp and in parallel with the LED;
   determining a total amount of power required for powering the loads populating the ports,
   communicating a power request to a power supply based on the determined total amount of required power;
   splitting power received from the power supply to the ports for supplying at least a part of the loads populating the ports; and
   applying a sense voltage to the first sense resistor, wherein the sense voltage is below a voltage required to illuminate the LED or is a negative voltage with respect to the LED.

15. A nontransitory storage medium comprising program code for causing a power splitter to carry out the steps of the method as claimed in claim 14 when the program code is run on the power splitter.

* * * * *